UNITED STATES PATENT OFFICE.

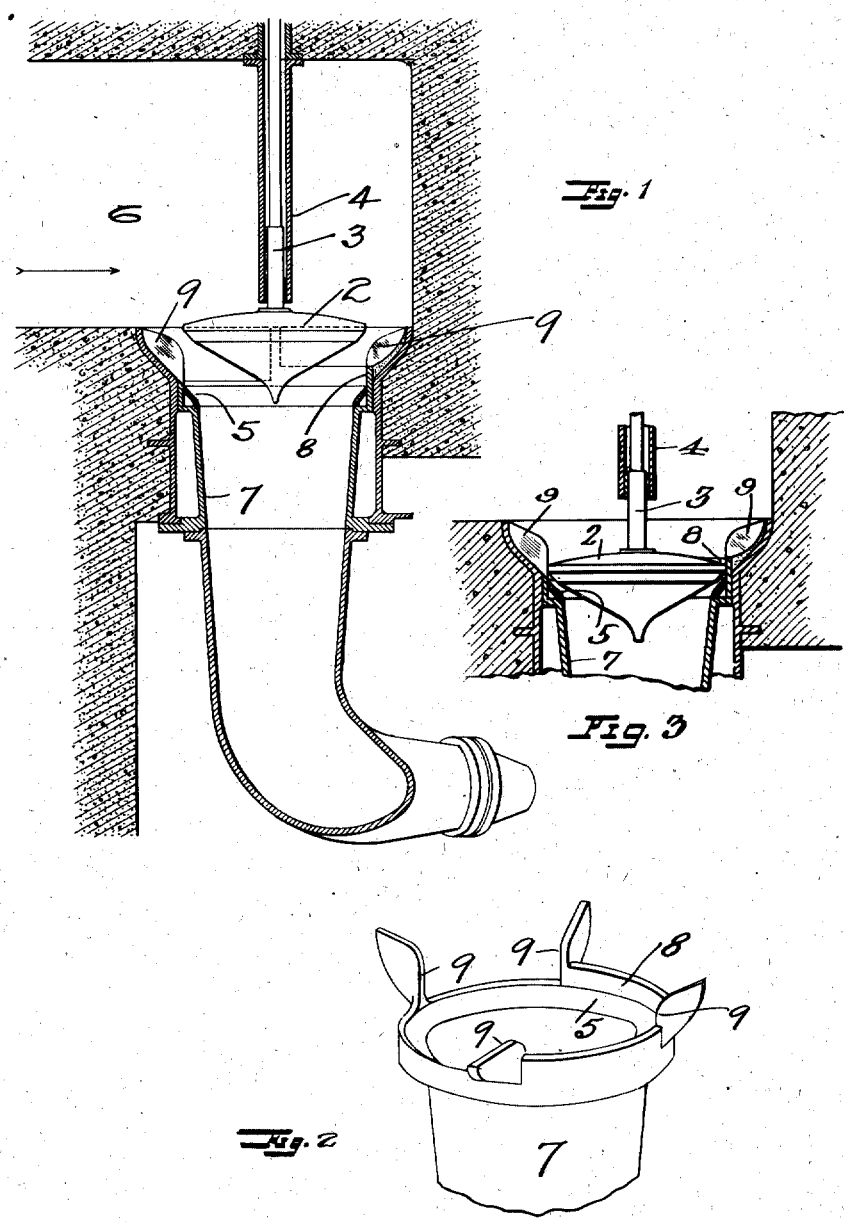

WILLIAM A. DOBLE, OF SAN FRANCISCO, CALIFORNIA, ASSIGNOR TO PELTON WATER WHEEL COMPANY, OF SAN FRANCISCO, CALIFORNIA, A CORPORATION OF CALIFORNIA.

VALVE.

1,253,013.  Specification of Letters Patent.  Patented Jan. 8, 1918.

Application filed November 20, 1916. Serial No. 132,255.

*To all whom it may concern:*

Be it known that I, WILLIAM A. DOBLE, a citizen of the United States, and a resident of the city and county of San Francisco and State of California, have invented a new and useful Valve, of which the following is a specification.

The invention relates to valves for controlling the flow of liquids, and particularly to the seats of such valves.

An object of the invention is to provide means for preventing vibration of the valve when liquid is flowing through the opening controlled thereby.

The invention is particularly applicable, although not limited to, large valves in which the valve moves perpendicularly with respect to the valve seat, and is designed to prevent vibration of the valve or valve stem and the liability of consequent fracture of the stem. In the drawings I have shown the invention as applied to a needle valve for controlling a large flow of water, and in the specification I shall describe the particular embodiment shown, but it is to be understood that the invention may be embodied in a plurality of forms and is not limited to the particular species shown.

In said drawings:

Figure 1 is a vertical section of a valve showing the construction of my invention.

Fig. 2 is a perspective view of one form of valve seat of my invention.

Fig. 3 is a vertical section of a portion of the valve shown in Fig. 1, but showing a different position of the valve relative to the valve seat.

In the present embodiment, the valve 2 in this instance, a modified form of needle valve is secured to the stem 3, which is arranged within a guide bearing or sleeve 4, to centralize and steady the valve. The valve is movable perpendicularly with respect to its seat 5 and controls the flow of water from the conduit 6 into the pipe or nozzle 7.

With the ordinary valve seat, in opening or closing the valve, a very severe vibration is set up in the valve stem during the time that the distance between the valve and its seat is small in comparison to its maximum separation and this vibration besides rendering the operation of the valve unsatisfactory, has resulted in the fracture of the valve stem. The rushing of the water through the small area surrounding the valve apparently acts on the valve as air does on the reed of an organ and causes an intense vibration.

In order to prevent this vibration, I deliberately throw the forces of the rushing water acting on the valve out of balance, and this I accomplish by confining the rushing water during the initial opening or final closing of the valve to an area surrounding less than the periphery of the valve. This is accomplished by providing a ring or flange 8 partly surrounding the valve seat and of such diameter as to contact with the side of the valve during the period of critical opening of the valve. Fig. 3 shows the valve 2 in contact with the ring 8 during this critical period, the flange shutting off a portion of the flow on that side. This ring extends upward above the valve seat preferably on the other side of the valve from which the water approaches, so that when the valve is in its position of critical opening, the water may flow in a smooth stream through the space between the valve and the seat. Guides 9 are preferably provided around the valve seat at suitable intervals, which contact with the valve before it enters the critical zone and after it leaves such zone, so that the valve will be guided to the ring 8 and so that it will not be subjected to any deleterious strains as it starts to leave the ring 8.

In the present instance, the ring 8 is formed integral with the pipe 7, but this is merely a matter of choice. Also, the ring is shown extending for one-half the periphery of the valve seat, but this is also a matter of choice and the ring may extend through a greater or a lesser arc, but it must extend through a sufficient arc to produce a substantial unbalance of the forces of the water acting on the valve. The water outflow passage, above the valve seat, slopes outward in a smooth curve, so that the water is directed in a smooth stream past the valve.

I claim:

1. In a valve structure for the control of fluids, a valve seat, a valve movable to engage and disengage said seat and means for causing the flow of fluid between said valve and said seat to exert unequal pressures upon said valve transversely of its line of movement.

2. In a valve structure for the control of fluids, a valve seat, a valve movable to engage and disengage said seat and means including a wall associated with said valve for causing the flow of fluid between said valve and said seat to exert unequal pressures upon said valve transversely of its line of movement.

3. In a valve structure for the control of fluids, a valve seat, a valve movable perpendicularly in respect of said seat, and a wall of less height than the stroke of said valve partly surrounding said valve and in sliding engagement therewith, whereby unequal pressures are exerted by said fluid upon said valve transversely of its line of movement.

4. In a valve structure for the control of fluids, a valve seat, a valve movable perpendicularly in respect of said seat, and a wall secured to said seat and partly surrounding and engaging said valve, said wall serving to close a portion of the passage between the valve and its seat, whereby unequal pressures are exerted by said fluid upon said valve transversely of its line of movement.

5. In a valve structure, a valve seat, a valve movable perpendicularly in respect of said seat, a wall partly surrounding said valve and in sliding engagement therewith and valve guides extending from said wall.

6. The combination with a conduit through which water is adapted to flow, of a discharge opening in said conduit, a valve seat arranged in said opening, a needle valve movable perpendicularly in respect of said seat, and a wall partly surrounding the valve seat and arranged to form a sliding contact with said valve, for concentrating the forces exerted by said fluid against said valve transversely of the line of movement of the valve, upon one side thereof.

7. In a valve structure for the control of fluids, a valve seat, a valve movable perpendicularly in respect of the plane of said seat and means for causing the flow of fluid between said valve and said seat at the beginning of the opening movement and the end of the closing movement of the valve to exert an unbalanced force upon said valve transversely of its line of movement.

In testimony whereof, I have hereunto set my hand at San Francisco, California, this 13th day of November, 1916.

WILLIAM A. DOBLE.

In presence of—
H. G. PROST.